United States Patent [19]

Sugiura

[11] Patent Number: 4,464,498

[45] Date of Patent: Aug. 7, 1984

[54] MEMBRANE FOR CONCENTRATING AMINO ACIDS AND PROCESS FOR CONCENTRATING AMINO ACIDS

[75] Inventor: Masaaki Sugiura, Yatabe, Japan

[73] Assignee: Agency of Industrial Science and Technology, Tokyo, Japan

[21] Appl. No.: 350,229

[22] Filed: Feb. 19, 1982

[30] Foreign Application Priority Data

May 20, 1981 [JP] Japan ................................. 56-76103

[51] Int. Cl.$^3$ ............................................... C08K 5/52
[52] U.S. Cl. ................................... 524/145; 562/445; 521/64; 521/85; 521/145
[58] Field of Search ......................................... 524/145

[56] References Cited

U.S. PATENT DOCUMENTS 3,801,526  4/1974  Lonning .............................. 524/145

Primary Examiner—Paul R. Michl
Attorney, Agent, or Firm—Armstrong, Nikaido, Marmelstein & Kubovcik

[57] ABSTRACT

A membrane for concentrating amino acids is made of a polyvinyl chloride composition containing 30 to 70 wt % of trialkyl phosphate and 2 to 20 wt % of halogenated hydrocarbon. This membrane is interposed between two amino acid solutions of the same concentration, one containing a salt that promotes the permeation of the amino acid, so that the amino acid permeates the membrane to become concentrated.

4 Claims, No Drawings

MEMBRANE FOR CONCENTRATING AMINO ACIDS AND PROCESS FOR CONCENTRATING AMINO ACIDS

BACKGROUND OF THE INVENTION

The present invention relates to a membrane for concentrating amino acids and, more particularly, to a membrane for concentrating amino acids by causing amino acids to permeate against the concentration gradient and to a process for concentrating amino acids by using the membrane for concentrating amino acids.

Heretofore, such hydrophilic polymeric membranes as cellophane (cellulose), collagen, keratin, and polyvinyl alcohol have been known as the membranes which are permeable to amino acids dissolved in an aqueous solution. These membranes permit amino acids to permeate along the direction of concentration gradient, or from the high concentration to the low concentration, because permeation is the passing of amino acids through the gell structure of the polymer constituting the membrane. Thus, they have no function to permit amino acids to permeate against the concentration gradient, or from the low concentration to high concentration, whereby to concentrate amino acid solutions.

The present inventor has previously proposed a polyvinyl chloride membrane containing a metal chelating agent, said membrane permitting metal ions or lipophilic anions to permeate against the concentration gradient, whereby concentrating the ions. To concentrate metal ions in a solution by using this membrane, the solution is separated by this membrane and lipophilic anions are added to one portion of the solution. Metal ions in one moiety of the solution diffuse into the other moiety across the membrane, resulting in concentration of metal ions. In the similar manner, lipophilic anions are concentrated by dividing the solution containing lipophilic anions with the membrane and adding metal ions to one moiety of the solution. The polyvinyl chloride membrane containing a metal chelating agent is able to concentrate ions. In other words, when such a membrane is placed in a solution to divide it into two, the membrane causes specific metal ions to diffuse across it from one side of the solution to the other. It should be noted that concentration by this method is applicable to metal ions and lipophilic anions, but not to hydrophilic substances of large molecules like amino acids.

SUMMARY OF THE INVENTION

It is an object of the present invention to provide a membrane for concentrating amino acids, said membrane being different in structure from hydrophilic membranes such as cellophane and in surface chemical performance from membranes for concentrating metal ions and lipophilic anions, and permitting hydrophilic amino acids to diffuse through it regardless of concentration gradient, or from high concentration side to low concentration side as well as from low concentration side to high concentration side.

It is another object of the present invention to provide a process for producing the aforesaid membrane for concentrating amino acids.

It is further another object of the present invention to provide a process for concentrating amino acids using the membrane for concentrating amino acids.

The membrane for concentrating amino acids in this invention is made of a polyvinyl chloride composition containing 30 to 70 wt. % of trialkyl phosphate and 2 to 20 wt. % of halogenated hydrocarbon.

The membrane for concentrating amino acids in this invention is produced by dissolving polyvinyl chloride in an organic solvent 10 to 20 times by weight, adding with mixing 30 to 70 wt. % of trialkyl phosphate and 2 to 20 wt. % of halogenated hydrocarbon, based on the total solute, and pouring the solution onto a flat plate, followed by drying.

According to the process of this invention, concentration of amino acids is accomplished in such a manner that the membrane for concentrating amino acids is interposed between two solutions, one solution containing an amino acid and a lipophilic alkali metal salt and the other solution containing an amino acid alone or together with a lipophilic alkali metal salt in a less amount than the former solution, so that the amino acid is caused to diffuse from one solution to the other.

DESCRIPTION OF THE PREFERRED EMBODIMENTS

The polyvinyl chloride for the membrane for concentrating amino acids may be produced from the same raw materials as are commonly used for polyvinyl chloride membranes.

The trialkyl phosphate to be added to the membrane should be one which has a hydrocarbon chain of 1 to 6 carbon atoms and is barely soluble in water. Preferable examples are triamyl phosphate, tributyl phosphate, and tributoxyethyl phosphate. The trialkyl phosphate plasticizes the polyvinyl chloride membrane and also works as a medium for permeation of amino acids.

The trialkyl phosphate is added in an amount of 30 to 70 wt. %, preferably 40 to 60 wt. %, based on the total composition. If the quantity is less than 30 wt. %, the resulting membrane is less permeable to amino acids, and if the quantity exceeds 70 wt. %, the resulting composition cannot be processed into a membrane.

The halogenated hydrocarbon which constitutes the membrane for concentrating amino acids helps mobilize amino acids in cooperation with the aforesaid trialkyl phosphate. It is a liquid, less volatile compound of 4 to 10 carbon atoms. Preferable examples are hexachloro-1,3-butadiene, 1,8-dichlorooctane, and 1,10-dichlorodecane.

The halogenated hydrocarbon should be added in an amount of 2 to 20 wt. %, preferably 5 to 15 wt. %, based on the entire composition. If the quantity added is less than 2 wt. %, the resulting membrane is less permeable to amino acids, and if it exceeds 20 wt. %, the resulting membrane is weak and some kinds of halogenated hydrocarbons separate from the membrane.

According to the present invention, the membrane for concentrating amino acids should preferably be 0.05 to 0.5 mm thick, still preferably 0.07 to 0.2 mm thick.

According to the present invention, the membrane for concentrating amino acids is produced by dissolving 5 to 7 g of polyvinyl chloride in 100 ml of tetrahydrofuran, and adding to 100 ml of this solution 3 to 18 ml of trialkyl phosphate and 0.4 to 3 ml of a halogenated hydrocarbon. After thorough mixing, a certain quantity of the resulting solution is poured onto a certain area of a glass plate and air-dried at room temperature for 2 to 4 hours. Thus, a membrane of about 0.1 mm thickness is obtained.

The membrane for concentrating amino acids prepared in this manner is placed in an aqueous solution containing an amino acid to be concentrated so as to divide the solution into two portions, and a salt that promotes the concentration of the amino acid is added to one portion of the solution. Thus, the amino acid in one portion permeates the membrane against the concentration gradient and concentration is accomplished. When the concentrating operation starts, the solutions divided by the membrane contain an amino acid at the same concentrations. With the lapse of time, the amino acid in the portion containing the salt that promotes the permeation of the amino acid diffuses into the other portion of the solution through the membrane. A certain time later, the concentration of the amino acid in that portion of the solution which contains the promoting agent becomes lower than that in the other portion of the solution. The diffusion of the amino acid in the direction from the low concentration side to the high concentration side, or against the concentration gradient, continues until there is no difference any longer in the concentration of the promoting agent between the two portions of the solution.

The salt to be added as a promoting agent should preferably be a lipophilic alkali metal salt such as lithium hexafluorophosphate and sodium perchlorate. In order to accelerate the rate of permeation of amino acids, the aqueous solution should be acid or alkaline rather than neutral.

The membrane for concentrating amino acids forms routes which amino acids pass through easily, because less hydrophilic polyvinyl chloride membrane contains a comparatively hydrophilic trialkyl phosphate. The trialkyl phosphate also works as a medium for permeation of the amino acid and the promoting agent salt combines with the amino acid, helping the amino acid to pass through the membrane.

In other words, the promoting salt passes through the membrane along the concentration gradient or in the direction from high concentration to low concentration. The promoting salt carries the amino acid therewith when it passes through the membrane. This is the reason why the amino acid diffuses against the concentration gradient. Thus, the concentration of amino acids by the membrane of this invention continues so long as there is difference in concentration of the salt that promotes the concentration of amino acids.

In the concentration of amino acids by the membrane of this invention, the permeation of amino acids against the concentration gradient takes place at such a rate as exemplified below. If the membrane is placed in an aqueous solution containing an amino acid at a concentration of 1 mM and 0.1 mol of lithium hexafluorophosphate is added to the moiety of the solution, the amino acid permeates the membrane in the direction from low concentration to high concentration at a rate of $2.2 \times 10^{-7}$ mol per 1 cm$^2$ in 1 hour at maximum. The permeation rate is twice or more faster than that for an amino acid permeating, along the concentration gradient, a cellophane membrane of the same thickness interposed between a 1 mM aqueous solution of amino acid and water containing no amino acid. The rate of permeation through the membrane for concentrating amino acids slightly varies depending on the kind of amino acid, but it is possible to increase the rate of permeation if the salt for promoting the permeation is added more. In the system mentioned above, compounds other than amino acids do not permeate the membrane.

The membrane for concentrating amino acids in this invention permits amino acids to permeate and become concentrated against the concentration gradient. In addition, the membrane is a strong polymeric membrane that can be handled like the conventional dialysis membranes and reverse osmosis membranes made of cellophane. It is expected to find uses in food industry and pharmaceutical industry. The present invention is, therefore, of great industrial significance.

The invention is illustrated by the following examples.

EXAMPLE 1

A: Preparation of membrane for concentrating amino acids

Three grams of polyvinyl chloride was dissolved in 50 ml of tetrahydrofuran. Four milliliters of this solution was poured into a flat glass Petri dish, 6 cm in diameter. To the Petri dish were added 0.5 ml of tributyl phosphate and 0.05 ml of hexachloro-1,3-butadiene. After thorough mixing, the Petri dish was placed on a flat bench and the solution was air-dried in the room at about 20° C. for 3 hours. The resulting membrane was 0.093 mm thick.

B: Test for permeation of L-isoleucine

The membrane prepared as above was interposed between two cylindrical glass cells, 3 cm in diameter and 35 ml in volume. The assembly was held in a thermostat at 25° C. One cell was filled with 35 ml of aqueous solution containing 1 mM L-isoleucine, 0.1M lithium hexafluorophosphate, and 10 mM sodium hydroxide, and the other cell was filled with 35 ml of aqueous solution containing 1 mM L-isoleucine and 10 mM sodium hydroxide. The solutions in the cells were kept stirred. Seven hours later, the concentration of L-isoleucine in the cell containing lithium hexafluorophosphate decreased to 0.67 mM, while the concentration of L-isoleucine in the other cell containing no hexafluorophosphate increased to 1.32 mM. In other words, L-isoleucine permeated the membrane at a rate of $2.2 \times 10^{-7}$ mol per 1 cm$^2$ of the membrane in 1 hour, in the direction from low concentration to high concentration, although there had been no difference in concentration between the two solutions when permeation was started.

EXAMPLE 2

A: Preparation of membrane for concentrating amino acids

Three grams of polyvinyl chloride was dissolved in 50 ml of tetrahydrofuran. Four milliliters of this solution was poured into the same Petri dish as used in Example 1-A. To the Petri dish were added 0.5 ml of triamyl phosphate and 0.03 ml of 1,8-dichlorooctane. After thorough mixing, the solution in the Petri dish was air-dried in the room at about 20° C. for 3 hours. The resulting membrane was 0.095 mm thick.

B: Test for permeation of D-phenylalanine

The membrane prepared as above was interposed between two cylindrical glass cells as used in Example 1-B. One cell was filled with 35 ml of aqueous solution containing 1 mM D-phenylalanine, 0.1M lithium hexafluorophosphate, and 10 mM sodium hydroxide, and the other cell was filled with 35 ml of aqueous solution containing 1 mM D-phenylalanine and 10 mM sodium hydroxide. Seven hours later, the concentration of D-phenylalanine in the cell containing lithium hexafluorophosphate decreased to 0.70 mM, while the concentration of D-phenylalanine in the other cell containing no lithium hexafluorophosphate increased to 1.29 mM. In other words, D-phenylalanine permeated the membrane at a rate of $2.1 \times 10^{-7}$ mol per 1 cm² of the membrane in 1 hour, in the direction from low concentration to high concentration, although there had been no difference in concentration between the two solutions when permeation was started.

EXAMPLE 3

A: Preparation of membrane for concentrating amino acids

Three grams of polyvinyl chloride was dissolved in 50 ml of tetrahydrofuran. Four milliliters of this solution was poured into the same Petri dish as used in Example 1-A. To the Petri dish were added 0.5 ml of tributoxyethyl phosphate and 0.1 ml of hexachloro-1,3-butadiene. After thorough mixing, the solution in the Petri dish was air-dried in the room at about 20° C. for 3 hours. The resulting membrane was 0.095 mm thick.

B: Test for permeation of L-tyrosine

The membrane prepared as above was interposed between two cylindrical glass cells as used in Example 1-B. One cell was filled with 35 ml of aqueous solution containing 1 mM L-tyrosine, 0.1M lithium hexafluorophosphate, and 5 mM sulfuric acid, and the other cell was filled with 35 ml of aqueous solution containing 1 mM L-tyrosine and 5 mM sulfuric acid. Seven hours later, the concentration of L-tyrosine in the cell containing lithium hexafluorophosphate decreased to 0.75 mM, while the concentration of L-tyrosine in the other cell containing no lithium hexafluorophosphate increased to 1.23 mM. In other words, L-tyrosine permeated the membrane at a rate of $1.6 \times 10^{-7}$ mol per 1 cm² of the membrane in 1 hour, in the direction from low concentration to high concentration, although there had been no difference in concentration between the two solutions when permeation was started.

EXAMPLE 4

A: Preparation of membrane for concentrating amino acids

Three grams of polyvinyl chloride was dissolved in 50 ml of tetrahydrofuran. Four milliliters of this solution was poured into the same Petri dish as used in Example 1-A. To the Petri dish were added 0.3 ml of tributyl phosphate and 0.2 ml of 1,10-dichlorodecane. After thorough mixing, the solution in the Petri dish was air-dried in the room at about 20° C. for 3 hours. The resulting membrane was 0.097 mm thick.

B: Test for permeation of DL-phenylglycine

The membrane prepared as above was interposed between two cylindrical glass cells as used in Example 1-B. One cell was filled with 35 ml of aqueous solution containing 1 mM DL-phenylglycine, 0.1M sodium perchlorate, and 5 mM sulfuric acid, and the other cell was filled with 35 ml of aqueous solution containing 1 mM DL-phenylglycine and 5 mM sulfuric acid. Seven hours later, the concentration of DL-phenylglycine in the cell containing sodium perchlorate decreased to 0.84 mM, while the concentration of DL-phenylglycine in the other cell containing no sodium perchlorate increased to 1.16 mM. In other words, DL-phenylglycine permeated the membrane at a rate of $1.1 \times 10^{-7}$ mol per 1 cm² of the membrane in 1 hour, in the direction from low concentration to high concentration, although there had been no difference in concentration between the two solutions when permeation was started.

What is claimed is:

1. An amino acid concentrating membrane, which comprises a polyvinyl chloride composition containing 30 to 70 wt. % of trialkyl phosphate ester each alkyl of which has 1 to 6 carbon atoms and 2 to 10 wt. % of halogenated hydrocarbon selected from the group consisting of hexachloro-1,3-butadiene, 1,8-dichlorooctane and 1,10-dichlorodecane.

2. An amino acid concentrating membrane as claimed in claim 1, wherein the membrane thickness is 0.05 to 0.5 mm.

3. A process for preparing a membrane having an amino acid concentrating property, which comprises dissolving 100 parts by weight of polyvinyl chloride in 1000 to 2000 parts by weight of an organic solvent, adding 30 to 70 wt. % of trialkyl phosphate ester each alkyl of which has 1 to 6 carbon atoms and 2 to 20 wt. % of halogenated hydrocarbon selected from the group consisting of hexachloro-1,3-butadiene, 1,8-dichlorooctane and 1,10-dichlorodecane, based on the total composition excluding the organic solvent, and thereafter pouring the solution on a flat plate, followed by drying.

4. A process as claimed in claim 3, wherein the organic solvent is tetrahydrofuran.

* * * * *